United States Patent
Barkai

(10) Patent No.: US 9,568,217 B2
(45) Date of Patent: Feb. 14, 2017

(54) GETTER SUPPORT STRUCTURE FOR A SOLAR THERMAL POWER PLANT

(75) Inventor: Menashe Barkai, Tel Aviv (IL)

(73) Assignee: SIEMENS CONCENTRATED SOLAR POWER LTD., Beit Shemesh (IL)

(*) Notice: Subject to any disclaimer, the term of this patent is extended or adjusted under 35 U.S.C. 154(b) by 1002 days.

(21) Appl. No.: 13/318,858

(22) PCT Filed: May 7, 2010

(86) PCT No.: PCT/EP2010/056249
§ 371 (c)(1),
(2), (4) Date: Nov. 4, 2011

(87) PCT Pub. No.: WO2010/128135
PCT Pub. Date: Nov. 11, 2010

(65) Prior Publication Data
US 2012/0048260 A1    Mar. 1, 2012

Related U.S. Application Data

(60) Provisional application No. 61/176,148, filed on May 7, 2009, provisional application No. 61/185,087, filed on Jun. 8, 2009.

(51) Int. Cl.
| | | |
|---|---|---|
| F24J 2/24 | (2006.01) |
| H01J 17/22 | (2012.01) |
| H01J 17/24 | (2012.01) |
| F24J 2/46 | (2006.01) |
| F24J 2/07 | (2006.01) |
| H01J 29/94 | (2006.01) |
| H01J 7/18 | (2006.01) |

(52) U.S. Cl.
CPC ............ *F24J 2/4612* (2013.01); *F24J 2/07* (2013.01); *F24J 2/4616* (2013.01); *H01J 7/186* (2013.01); *H01J 29/94* (2013.01); *Y02E 10/46* (2013.01)

(58) Field of Classification Search
CPC .......... F24J 2/07; F24J 2/4612; F24J 2/24616; H01J 7/186; H01J 29/94
USPC ......... 126/651, 653, 655; 313/552, 553, 560
See application file for complete search history.

(56) References Cited

U.S. PATENT DOCUMENTS

| | | | | |
|---|---|---|---|---|
| 3,634,717 A | * | 1/1972 | Boucher et al. ............... | 313/552 |
| 4,065,592 A | * | 12/1977 | McAllister ........................ | 428/92 |
| 4,259,946 A | | 4/1981 | Roehm | |
| 4,282,857 A | * | 8/1981 | Pei .................. | 126/584 |
| 4,649,903 A | * | 3/1987 | Takeuchi et al. ............... | 126/653 |
| 7,552,726 B2 | * | 6/2009 | Kuckelkorn et al. ......... | 126/653 |

(Continued)

FOREIGN PATENT DOCUMENTS

| | | |
|---|---|---|
| CN | 1720419 A | 1/2006 |
| CN | 2890766 Y | 4/2007 |

(Continued)

*Primary Examiner* — William G Corboy

(57) ABSTRACT

There is provided a pipe in a solar thermal power plant. The pipe includes an inner tube configured for carrying a heated heat transfer fluid, an outer tube surrounding the inner tube, wherein the space between the inner and outer tube is evacuated, and a getter restraint structure configured for maintaining getters in a predetermined position. The getter restraint structure is in contact with the outer tube and otherwise entirely free of contact with the inner tube and/or is in thermal isolation from the inner tube.

9 Claims, 3 Drawing Sheets

(56) References Cited

U.S. PATENT DOCUMENTS

2004/0134484 A1 7/2004 Barkai et al.
2010/0126499 A1* 5/2010 Lu .................................. 126/651

FOREIGN PATENT DOCUMENTS

| CN | 201191088 Y | 2/2009 |
| CN | 101392965 A | 3/2009 |
| CN | 201209968 Y | 3/2009 |
| JP | 56160550 A | 12/1981 |
| WO | WO 2009034577 A2 | 3/2009 |
| WO | WO 2010032238 A2 | 3/2010 |
| WO | WO 2010076790 A2 | 7/2010 |

* cited by examiner

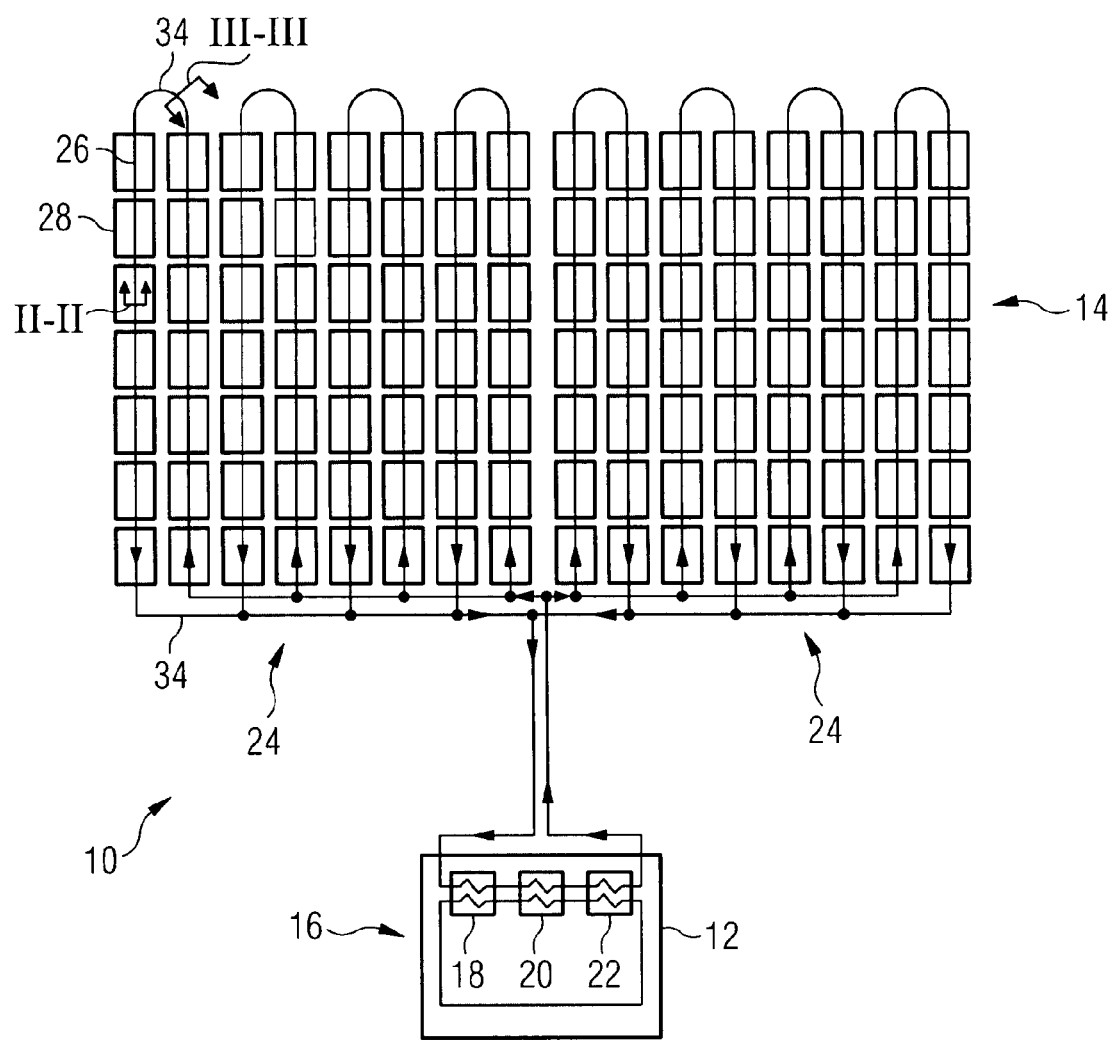
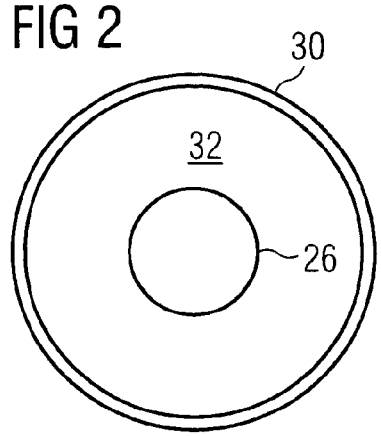

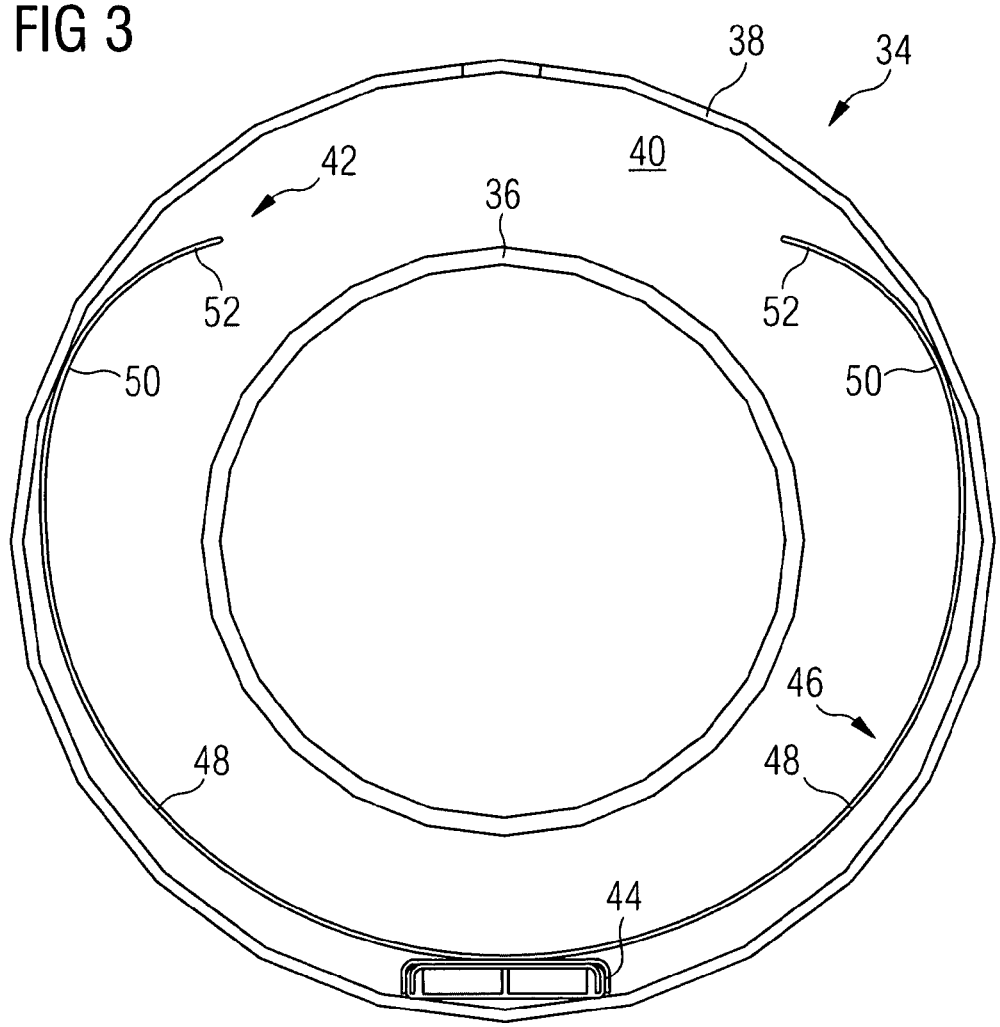

GETTER SUPPORT STRUCTURE FOR A SOLAR THERMAL POWER PLANT

CROSS REFERENCE TO RELATED APPLICATIONS

This application is the US National Stage of International Application No. PCT/EP2010/056249, filed May 7, 2010 and claims the benefit thereof. The International Application claims the benefits of U.S. applications No. 61/185,087 US filed Jun. 8, 2009 and 61/176,148 US filed May 7, 2009. All of the applications are incorporated by reference herein in their entirety.

FIELD OF THE INVENTION

This invention relates to solar thermal power plants, and in particular to arrangements for removing dissociated hydrogen therefrom.

BACKGROUND OF THE INVENTION

Amid concerns over global warming, and forecasts of both the depletion of non-renewable energy sources and rising power demand, suppliers of energy are increasingly seeking alternative primary sources of energy. One such source of energy is solar energy, and one way of utilizing solar energy is with a solar thermal power plant.

One type of solar power plant comprises a solar field which utilizes a "radiation concentrator collector" which concentrates the solar radiation by focusing it onto a smaller area, e.g., using mirrored surfaces or lenses. In this system, a reflector, which is typically parabolic, receives and reflects (focuses) incoming solar radiation onto a radiation absorber, which is formed as a tube. The tube radiation absorber is concentrically surrounded by a treated glass enclosure tube to limit the loss of heat. The collector system further includes means to track the sun.

The tube radiation absorber is made of metal with a coating having a high solar radiation absorption coefficient to maximize the energy transfer imparted by the solar radiation reflecting off the reflector. A heat transfer fluid (HTF), which is typically a liquid such as oil, flows within the tube radiation absorber.

The thermal energy is transported by the HTF to provide energy to, e.g., a thermal-electric power plant to drive one or more power-generation systems thereof, in order to generate electricity in a conventional way, e.g., by coupling the axle of each of the turbines to an electric generator. One such example of a thermal-electric power plant is a steam-electric power plant, which uses thermal energy provided thereto to produce steam to drive turbines thereof, which in turn drive a generator, thus generating electricity.

Throughout the solar field, the HTF flows within a tube, which is partially constituted by the tube radiation absorber. The entire length of the tube should be designed so as to limit thermal losses therefrom. Along much of its length, it is surrounded by a tube or pipe of a larger diameter, with the space therebetween being evacuated in order to limit heat loss due to convection. However, hydrogen may be released within the HTF, either by dissociation therefrom or as a product of a cathodic reaction with the interior of the tub, which escapes via the wall of the tube and enters the evacuated space. In order to maintain high efficiency of the solar power plant, as much of this hydrogen should be removed as is possible.

SUMMARY OF THE INVENTION

According to one aspect of the present invention, there is provided a pipe in a solar thermal power plant, the pipe comprising:

an inner tube configured for carrying a heated heat transfer fluid;

an outer tube surrounding the inner tube, wherein the space between the inner and outer tube is evacuated; and a getter restraint structure configured for maintaining getters in a predetermined position, wherein the getter restraint structure is in contact with the outer tube and otherwise entirely free of contact with the inner tube.

According to another aspect of the present invention, there is provided a pipe in a solar thermal power plant, the pipe comprising:

an inner tube configured for carrying a heated heat transfer fluid;

an outer tube surrounding the inner tube, wherein the space between the inner and outer tube is evacuated; and a getter restraint structure configured for maintaining getters in a predetermined position, wherein the getter restraint structure is in thermal isolation from the inner tube.

According to either of the above aspects, wherein the getter restraint structure may comprise:

a storage portion configured for containing therein the getters in fluid communication with the space between the inner and outer tube; and a support portion configured for contacting the outer tube, and to thereby maintain the position of the storage portion.

The storage portion may contact the outer tube, and cooperate with the support portion for maintaining the position of the getter restraint structure.

The storage portion may be at least partially constructed of a mesh material.

The support portion may comprise a biasing member configured to bear against an inner surface of the outer tube and to bias the storage portion against the inner surface, thereby maintaining the position of the getter restraint structure.

The biasing member may comprise a substantially arcuate flat spring. Opposite ends of the flat spring may be designed to bear against the inner surface of the outer tube, while a center portion thereof biases the storage portion against the inner surface.

The support portion may further comprise a connecting member attached to the biasing member and being configured for connecting it to the storage portion.

An outer surface of the inner tube may have an emissivity which is less than 5, or less than 3%.

The outer tube may be made of an opaque material, such as metal.

The pipe may be configured to be connected between two pipes of radiation solar collectors and to carry thermal fluid therebetween.

According to a further aspect of the present invention, there is provided a solar thermal power plant comprising a pipe according to one or both of the aspect described above.

According to a still further aspect of the present invention, there is provided a method for removing hydrogen from a solar thermal power plant, the method comprising:

providing a pipe having an inner tube configured for carrying a heated heat transfer fluid, and an outer tube surrounding the inner tube, wherein the space between the inner and outer tube is evacuated;

providing getters within the space; and maintaining the getters in a predetermined position in thermal isolation from the inner tube;

whereby the getters remove hydrogen from the space.

The method may further comprise facilitating the maintaining by providing a getter restraint structure configured for maintaining getters in a predetermined position, wherein the getter restraint structure is in contact with the outer tube and otherwise entirely free of contact with the inner tube.

The getter restraint structure may comprise:

a storage portion configured for containing therein the getters in fluid communication with the space between the inner and outer tube; and a support portion configured for contacting the outer tube, and to thereby maintain the position of the storage portion.

The storage portion may contact the outer tube, and cooperate with the support portion for maintaining the position of the getter restraint structure.

The storage portion may be at least partially constructed of a mesh material.

The support portion may comprise a biasing member configured to bear against an inner surface of the outer tube and to bias the storage portion against the inner surface, thereby maintaining the position of the getter restraint structure.

The biasing member may comprise a substantially arcuate flat spring. Opposite ends of the flat spring may be designed to bear against the inner surface of the outer tube, while a center portion thereof biases the storage portion against the inner surface.

The support portion may further comprise a connecting member attached to the biasing member and being configured for connecting it to the storage portion.

An outer surface of the inner tube may have an emissivity which is less than 5%, or less than 3%.

The outer tube may be made of an opaque material, such as metal.

BRIEF DESCRIPTION OF THE DRAWINGS

In order to understand the invention and to see how it may be carried out in practice, an embodiment will now be described, by way of a non-limiting example only, with reference to the accompanying drawings, in which:

FIG. 1 is a schematic illustrated of a solar thermal power plant;

FIG. 2 is a cross-sectional view of a tube radiation absorber of the solar thermal power plant illustrated in FIG. 1, taken along line II-II therein;

FIG. 3 is a cross-sectional view of a connector pipe of the solar thermal power plant illustrated in FIG. 1, taken along line III-III therein.

DETAILED DESCRIPTION OF EMBODIMENTS

Figure 4:
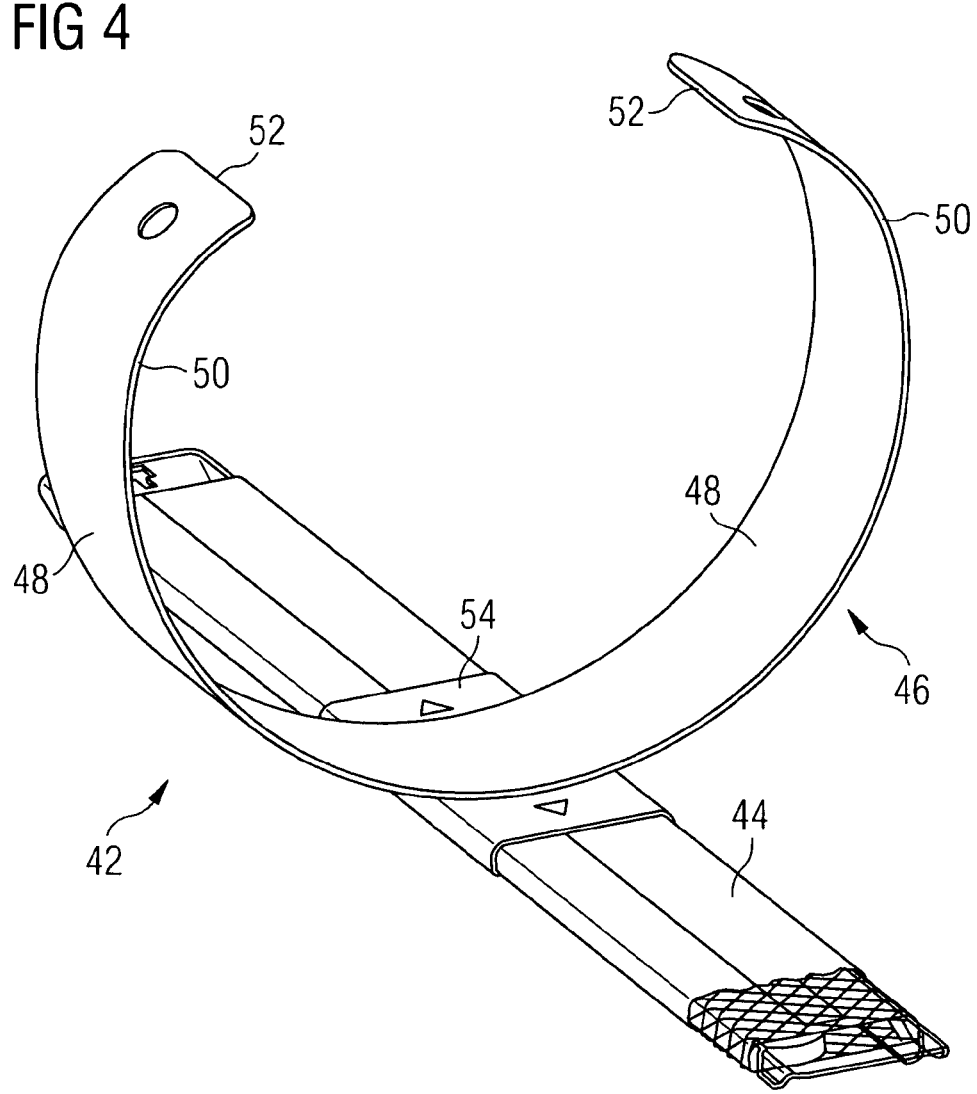
FIG. 4 is a perspective view of a getter support structure illustrated in FIG. 3.

As illustrated in FIG. 1, there is provided a solar thermal power plant, generally indicated at 10. The plant 10 comprises a power block 12, such as a thermal-electric power plant, which utilizes heat to drive its operation to produce electricity, and a solar collection system 14 for providing the heat therefor. The solar thermal power plant may be designed in accordance with that described in PCT/IL2009/000899, filed on Sep. 15, 2009, to the present applicant, the disclosure of which is incorporated herein by reference.

The power block 12 comprises elements which are typically found within a power plant and which are well-known, such as one or more turbines, a condenser, feedwater heaters, pumps, etc. (individual elements of the power block are not illustrated). The turbines are coupled to an electrical generator for generating electricity, as is well known in the art. The power block 12 may be designed in accordance with that described in WO 2009/034577, filed on Sep. 11, 2008, to the present applicant, the disclosure of which is incorporated herein by reference.

The power block 12 further comprises a steam generation system 16 comprising a steam generation train having three heat exchangers, a pre-heater 18, an evaporator 20, and a super-heater 22. The steam generation train is configured to transfer heat from an outside source (in this case, the solar collection system 14) to working fluid of the power block 12, so that it can reach the elevated temperature and pressure required to optimally drive the turbines thereof. The steam generation train may further comprise an optional reheater (not illustrated).

The solar collection system 14 comprises one or more solar fields 24, which are configured to capture heat from sunlight impinging thereon and transfer it to the steam generation system 14 of the power block 12 for driving its operation. (It will be appreciated that while the solar collection system 24 is illustrated in FIG. 1 as comprising two solar fields, any suitable number of fields may be provided without departing from the spirit and scope of the present invention, mutatis mutandis.) For this purpose, the solar fields 24 comprise at least several tube radiation absorbers 26, which may be made out of stainless steel, and a plurality of trough collectors 28, such as single-axis parabolic reflectors.

As illustrated in FIG. 2, portions of the tube radiation absorbers 26 which are within the collectors 28 are surrounded by a glass envelope 30 spaced therefrom, thus defining a volume 32 between the tube radiation absorber 26 and the glass envelope which is evacuated in order to limit heat loss. Alternatively, any suitable means for concentrating solar radiation, such as Fresnel collectors, may be provided. The tube radiation absorbers 26 carry a heat transfer fluid (HTF) therein, such as a thermal oil (phenyls) which is commercially available, such as under the trade name Therminol® VP-1, Dowtherm™, etc. Alternatively, the HTF may also be one of steam/water, in which case the plant 10 may operate using direct steam, i.e., the HTF is used as the working fluid for the turbines of the power block 12, and thus the steam generation system 16 may be excluded. The HTF, according to any of the embodiments, is heated within the tube radiation absorbers 26 upon their exposure to direct solar radiation and solar radiation concentrated by the trough collectors 28. Thus, the HTF is heated as it flows through the tube radiation absorbers 26. Solar collection systems of this type are provided, inter alia, by Siemens Concentrated Solar Power, Ltd.

The solar fields 24 further comprise a plurality of connector pipes 34 bridging between adjacent tube radiation absorbers 26. The connector pipes 34 are designed to carry HTF which has been heated within one of the tube radiation absorbers 26 to another one for further heating. Although the connector pipe 34 may be exposed to direct solar radiation, the solar field 24 may be designed such that this is not so, and in any event, such that the connector pipe is not exposed to any concentrated solar radiation. It is designed so as to prevent or limit thermal losses from the HTF therein, and not to heat HTF therein.

As illustrated in FIG. 3, each of the connector pipes 34 comprises an inner tube 36 in fluid communication with adjacent tube radiation absorbers, and an outer tube 38 therearound, defining a space 40 therebetween, which is evacuated and which may be in fluid communication with the volume 32 between the tube radiation absorber 26 and glass envelope 30 as described above. Although the structure of the connector pipe 34 is similar to that of the tube radiation absorber 26 and glass envelope 30 as described above with reference to FIG. 2, the construction of the inner and outer tubes 36, 38 thereof may be different, as described below.

As mentioned, the connector pipe 34 is not designed to be exposed to solar radiation, but only to prevent or limit thermal losses of HTF therein. Therefore, the inner tube 36 thereof differs in construction from the tube radiation absorber 26 in that it does not require any coating which is designed to provide a high solar absorbing coefficient. Therefore, it may be provided without any special coating, or with a coating which is designed to provide a low emissivity, for example $\epsilon(400°$ C.) of less than 5% or less than 3%, without the need to take into account the relatively low solar absorbing coefficient which typically accompanies a low value of emissivity.

The outer tube 38 of the connector pipe 34 differs in construction from the glass envelope 30 in that it does not need to be transparent to solar radiation, i.e., it may be opaque. Therefore, it may be made of a less fragile material than the glass envelope. For example, it may be made of stainless steel or any other suitable metal.

During operation of the plant 10, the HTF is heated. In a case where the HTF is provided as a thermal oil, hydrogen is released by dissociation therefrom. In a case where the HTF is provided as water/steam, i.e., when the plant 10 operates using direct steam as described above, corrosion of the inner tube 36 of the connector pipe 34 may be associated with a cathodic reaction in which hydrogen is released. In either case, as hydrogen is a relatively small molecule, the material of the tube radiation absorber 26 exhibits a degree of permeability thereto; thus, some of it escapes the inner tube 36 and enters the evacuated space 40 between it and the outer tube 38. The presence of this hydrogen in the space 40 allows for conductive heat flow between the inner tube 36 and the atmosphere, thus resulting in heat losses. As is well known in the art, getters (not illustrated) may be provided within the evacuated space 40 to sequester this hydrogen, and thus limit the heat loss.

As further illustrated in FIG. 3 and as additionally illustrated in FIG. 4, a getter restraint structure, which is designated by 42, is provided within the space 40 between the inner and outer tubes 36, 38 of the connector pipe 34. The getter restraint structure 42 may be designed to maintain the getters in a predetermined position within the space 40 by contacting the outer tube, while being entirely free of contact with (i.e., spaced from) the inner tube 36. As the inner tube 36 is typically at an elevated temperature during use of the plant 10, keeping the getters in thermal isolation therefrom ensures that their temperature will not become elevated, which would restrict the amount of hydrogen which may be stored thereby.

For example, the inner tube 36 may reach a temperature of up to 400° C. By keeping the getters thermally isolated therefrom, they are kept at a lower temperature, for example up to about 150° C. This allows it to absorb a higher amount of hydrogen than if it would reach the temperature of the inner tube, thus increasing the useful like of the connector pipe 34.

It will be appreciated that herein the specification and claims, the ten "entirely free of contact with" denotes no solid connection between two elements, and no intervening connection therebetween as well.

The getter support structure 42 comprises a storage portion 44 which is configured to contain therewithin getters, and a support portion 46 which is configured for contacting the outer tube 38, and to thereby maintain the position of the storage portion, and thus the getters, within the space 40.

The storage portion 44 is designed so as to maintain its contents (i.e., the getters) in fluid communication with the space 40. As such, it may be constructed at least partially from a mesh material, or be at least partially of any other suitable open structure.

The support portion 46 may comprise a biasing member 48 which is designed to maintain the position of the storage portion within the space 40 by bearing against an inner surface of the outer tube 38, while at the same time biasing the storage portion 44 against the inner surface.

As illustrated, the biasing member 48 may be constituted by a substantially arcuate flat spring, with a radius of curvature in its relaxed (i.e., unloaded) position which is larger than that of the inner surface of the outer tube 38. Thus, when the biasing member 48 is compressed (by imparting a smaller radius of curvature thereto) and inserted within the outer tube 38, it tends to open (i.e., toward a larger radius of curvature), which results in opposite ends 50 thereof bearing against the inner surface of the outer tube. It will be noted that extreme ends 52 of the biasing member 48 may have a radius of curvature which is smaller than that of the inner surface of the outer tube 38. The storage portion 44 may be positioned at or near the midpoint of the biasing member 48, enabling it to be biased against the inner portion of the outer tube 38.

It will be noted that the two ends 50 of the biasing member 48 and the storage portion 44 may contact the inner surface of the outer tube 38 at points thereof which are generally evenly spaced about the circumference thereof.

The support portion further may comprise a connecting member 54 attached to the biasing member 48, which is configured for connecting support portion to the storage portion 44. The connecting member may be a clasp or any other suitable element.

According to the example described above with reference to FIGS. 3 and 4, the getters are maintained at a position in which they do not contact the inner tube 36 of the connector pipe 34, nor does any element of the getter support structure 42. Thus, they are in thermal isolation from the inner tube 36, which, during use of the plant, is a source of heat which would, in the absence of the thermal isolation, raise the temperature of the getters, adversely affecting their capacity for hydrogen sequestering.

In addition, the getters may be maintained in a position in which they are very close to the outer tube 38 of the connector pipe 34. This enables the getters to be positioned within the pipe 32 before it is installed in the solar field 24 and ensure that the position is maintained, allowing for the getters to be activated by heating through the outer tube once the solar field 24 is fully constructed. The maintaining of the getters in a position adjacent the outer tube 38 facilitates this.

Those skilled in the art to which this invention pertains will readily appreciate that numerous changes, variations and modifications can be made without departing from the scope of the invention mutatis mutandis.

The invention claimed is:

1. A pipe in a solar thermal power plant, the pipe comprising:

an inner tube configured for carrying a heated heat transfer fluid;

an outer tube surrounding the inner tube, wherein a space between the inner and outer tube is evacuated; and a getter restraint structure configured for maintaining a plurality of getters in a predetermined position, wherein the getter restraint structure is in contact with the outer tube and otherwise entirely free of contact with the inner tube such that there is no solid connection between the getter restraint structure and the inner tube as well as no intervening connection therebetween, wherein the getter restraint structure is in thermal isolation from the inner tube; and wherein the getter restraint structure comprises:

a storage portion configured for containing therein the plurality of getters in fluid communication with the space between the inner and outer tube, and a biasing member configured to bias the storage portion against an inner surface of the outer tube; and a connecting member attached to the biasing member for connecting the biasing member to the storage portion, wherein the connecting member and the storage portion are centered at a midpoint of the biasing member.

2. The pipe according to claim 1, wherein the storage portion is at least partially constructed of a mesh material.

3. The pipe according to claim 1, wherein the biasing member comprises an arcuate flat spring.

4. The pipe according to claim 3, wherein opposite ends of the flat spring are designed to bear against the inner surface of the outer tube, while a center portion thereof biases the storage portion against the inner surface.

5. The pipe according to claim 1, wherein an outer surface of the inner tube has an emissivity which is less than 5%.

6. The pipe according to claim 5, wherein the emissivity is less than 3%.

7. The pipe according to claim 1, wherein the outer tube is made of an opaque material.

8. The pipe according to claim 7, wherein the opaque material is a metal.

9. The pipe according to claim 1, wherein the pipe is configured to be connected between two pipes of radiation solar collectors and to carry thermal fluid therebetween.

* * * * *